United States Patent
Geiser (10) Patent No.: US 6,494,434 B1
(45) Date of Patent: Dec. 17, 2002

(54) BUTTERFLY VALVE

(75) Inventor: Friedrich Geiser, Nueziders (AT)

(73) Assignee: VAT Holding AG, Haag (CH)

( * ) Notice: Subject to any disclaimer, the term of this patent is extended or adjusted under 35 U.S.C. 154(b) by 0 days.

(21) Appl. No.: 09/904,426

(22) Filed: Jul. 12, 2001

(51) Int. Cl.[7] ..................... F16K 31/122; F16K 31/528
(52) U.S. Cl. ................. 251/229; 251/58; 251/252; 74/25; 74/57
(58) Field of Search ........................... 251/203, 204, 251/56, 58, 215, 229, 252, 305, 308, 192; 74/25, 57, 89

(56) References Cited

U.S. PATENT DOCUMENTS

| | | | |
|---|---|---|---|
| 4,504,038 A | * 3/1985 | King | 251/58 |
| 4,634,094 A | 1/1987 | Geiser | |
| 4,666,124 A | * 5/1987 | Giacobbi | 251/252 X |
| 5,269,492 A | * 12/1993 | McLennan | 251/229 |
| 6,135,416 A | * 10/2000 | Keene | 251/229 X |

FOREIGN PATENT DOCUMENTS

DE 35 33 937 11/1986

OTHER PUBLICATIONS

*English Abstract of DE 35 33 937.

* cited by examiner

*Primary Examiner*—Kevin Lee
(74) *Attorney, Agent, or Firm*—Reed Smith LLP (57) ABSTRACT

A butterfly valve comprises a valve housing with a valve opening and a valve seat, this valve housing enclosing a vacuum area of the valve; a valve plate which is mounted at a valve rod guided through the valve housing and which is pressed against the valve seat in a closed position of the valve, tilted relative to the valve seat in a partially open position of the valve through tilting of the valve rod about a tilting axis, and tilted and rotated relative to the valve in a completely open position of the valve by subsequent rotation of the valve rod about its longitudinal axis; wherein the valve rod has portions extending on both sides of the tilting axis, the portion located on one side of the tilting axis acting centrally at the valve plate and the portion located on the other side of the tilting axis being connected, via a link guide which is located outside the vacuum area and which has a link with a part extending at an inclination to the longitudinal axis of the valve rod and a helical surface-shaped part and a journal which is guided in the link, to an actuating member which is mounted so as to be displaceable in axial direction of the valve rod.

15 Claims, 7 Drawing Sheets

BUTTERFLY VALVE

BACKGROUND OF THE INVENTION a) Field of the Invention

The invention is directed to a butterfly valve. In particular, the invention relates to a butterfly valve comprising a valve housing with a valve opening and a valve seat and a valve plate which is pressed against the valve seat in a closed position of the valve, is tilted relative to the valve seat in a partially open position of the valve and is tilted and rotated relative to the valve seat in a completely open position of the valve.

b) Description of the Related Art

Vacuum valves in the form of butterfly valves, as they are called, are known in different embodiment forms. In these butterfly valves, the valve plate is initially swiveled relative to the valve seat in order to open the valve and is then rotated by about , 90° so that when the valve opening is viewed from the end only the narrow side of the valve plate is visible: and the valve plate accordingly essentially releases the valve opening. In order to impede the through-flow through the valve opening as little as possible, the valve plate is constructed so as to be correspondingly narrow and the bearing parts of the valve plate have the smallest possible cross section. Butterfly valves of this type are known in particular from U.S. Pat. No. 4,634,094 and German Patent DE 35 33 937 C1. A supporting shaft carrying a joint ball which is mounted in the housing so as to be swivelable on all sides is provided at the edge of the valve plate on one side and, in a diametrical arrangement, a connection part is provided at the other side. This connection part carries a pin or journal which is guided in a gate or link of an axially displaceable selector shaft or switching rod. The opening movement and closing movement of the valve plate is conveyed through an axial movement of the switching rod via this link.

A disadvantage in these known butterfly valves consists in that particles are released into the vacuum by the rolling and sliding movements of the joint ball in the housing and of the journal in the link during the adjustment of the valve. Further, these parts which move relative to one another require lubrication, so that a lubricating grease must be disadvantageously provided in the vacuum. In order that the free through-opening is as large as possible in the opened state of the valve, the links and the connection part with the journal must be constructed so as to be relatively small, so that the construction of these guide parts is delicate and comparatively prone to disturbance on the whole. Further, when the valve plate is adjusted, an axial force is exerted on the joint ball which is swivelably mounted in the housing. After prolonged use of the valve, these axial forces lead to increased friction on the ball relative to the seat. This in turn causes an increase in axial forces and so on, so that the bearing and joint ball are ultimately destroyed and the valve is unusable.

OBJECT AND SUMMARY OF THE INVENTION

It is an object of the invention to provide a butterfly valve in which the release of particles in the vacuum when the valve is actuated is reduced. A further object of the invention is to provide a butterfly valve in which a lubricating grease need not be used in the vacuum. It is another object of the invention to provide a butterfly valve having no parts moving relative to one another in the vacuum. It is a further object of the invention to provide a butterfly valve which is less susceptible to malfunction and which has a longer life. It is another object of the invention to provide a butterfly valve which can be manufactured using simple techniques and which is easy to service.

A butterfly valve according to the invention comprises a valve housing with a valve opening and a valve seat, this valve housing enclosing a vacuum area of the valve; a valve plate which is mounted at a valve rod guided through the valve housing and which is pressed against the valve seat in a closed position of the valve, tilted relative to the valve seat in a partially open position of the valve through tilting of the valve rod about a tilting axis, and tilted and rotated relative to the valve seat in a completely open position of the valve by subsequent rotation of the valve rod about its longitudinal axis; wherein the valve rod has portions extending on both sides of the tilting axis, the portion located on one side of the tilting axis acting centrally at the valve plate and the portion located on the other side of the tilting axis being connected, via a link guide which is located outside the vacuum area and which has a link with a part extending at an inclination to the longitudinal axis of the valve rod and a helical surface-shaped part and a journal which is guided in the link, to an actuating member which is mounted so as to be displaceable in axial direction of the valve rod.

Accordingly, in a butterfly valve according to the invention, the link guide for generating the closing movement of the valve is located outside of the valve opening and also outside of the vacuum. Therefore, this guide can be constructed in a correspondingly robust manner without impairing the through-flow cross section of the valve in the opened state. Further, the lubrication of the link guide located outside of the vacuum does not present a problem. Further, in a butterfly valve according to the invention, other guide parts moving relative to one another can also be avoided in the vacuum. This minimizes the release of particles in the vacuum when opening and closing the valve. A vacuum valve according to the invention can also be designed for a long service life.

In a preferred embodiment example, the tilting axis of the valve rod is formed by a journal which penetrates the valve rod, this journal being mounted in a ball bearing surrounding the valve rod so that it can swivel about the longitudinal axis of the valve rod in this way. This results in a low-friction, durable rotating/tilting joint which has only slight play.

The various features and developments according to the invention are given in the claims.

Further advantages and details of the invention are mentioned in the following with reference to the embodiment example shown in the drawing and further objects of the invention follow therefrom.

DESCRIPTION OF THE PREFERRED EXAMPLES

The butterfly valve shown in the drawings comprises a valve housing 1 with a valve opening 2 which narrows, e.g., conically or spherically toward one flange side 3 of the housing 1 (the center point of the narrowing spherical surfaces being located on the axis of rotation of the valve rod described in the following). These tapering or narrowing surfaces form a valve seat 4 for a valve plate 5. The valve plate 5 has a slotted edge with a circumferentially closed sealing ring 6 which is made of Viton, for example.

The valve plate 5 in the form of a relatively thin-walled circular disk is rigidly fastened to a valve rod 7 which acts centrally on the back of the valve plate 5. The valve rod is guided through the valve housing 1 by means of a vacuum through-guide which is described more exactly in the following and its end which protrudes from the valve housing projects into a cylinder 8, this cylinder being rigidly connected to the valve housing by screw connections.

The valve rod 7 is mounted so as to be tiltable and swivelable about the tilting axis 9. Portions of the valve rod lie on both sides of the tilting axis 9. The portion located at left in FIGS. 1 to 4 extends through the valve housing into the vacuum, wherein a seal or through-guide which is described in the following is provided and carries the valve plate 5. The portion located on the right extends into the cylinder 8, wherein a seal (described in the following) is likewise provided. The tilting axis 9 is formed by a pin 11, the valve rod being mounted in a sliding manner so as to be swivelable about the pin 11.

Further, the valve rod 7 is mounted so as to be rotatable about its longitudinal axis 10. For this purpose, the pin 11 is mounted by its two lateral ends in a ring 12 which surrounds the valve rod and which is mounted so as to be rotatable about its axis by means of a ball bearing 13 provided in a recess of the cylinder housing. In this way, a rotating/tilting joint is provided. On both sides of the pin 11, the valve rod 7 has projections 14, 15 which surround the latter annularly. The ascending face of the projection 14 facing the valve plate forms a part of a spherical surface whose center is the intersection between the tilting axis 9 and the central longitudinal axis 10 of the valve rod 7. This surface 16 forms a sealing surface, and a sealing ring 17 which seals the valve rod 7 relative to the valve housing is pressed against it. In this way, taken together, a rotating/tilting through-guide is formed for the valve rod 7. Due to the relatively slight tilting that is required, the surface 16 could also be constructed so as to be flat, wherein the elastic sealing ring 17 receives the occurring displacements. In the same way, the ascending face 18 of the projection 15 facing the cylinder 8 is constructed as a sealing surface and a sealing ring 19 is pressed against the surface so as to cause a seal between the valve rod 7 and the cylinder 8.

A piston 20 acting on both sides is arranged so as to be displaceable in the cylinder 8. The piston 20 is displaced in the cylinder 8 in that one of the two cylinder spaces 21, 22 is acted upon by compressed air. The piston 20 is constructed in a sleeve-shaped manner with one side open toward the valve housing 1, the valve rod 7 projecting through the latter into the sleeve-shaped area of the piston 20. A sleeve 23 having the link 25 is secured (by screwing to the piston 20 via screws 24) inside the piston 20. The sleeve 23 with the link 25 is shown in an enlarged view in FIGS. 7 and 8. The link has a part which extends along the axial portion designated by b in FIG. 7 in the manner of a helical surface. The generating line of this link 25 has a rotational angle of 90° along its axial portion b. Adjoining this portion of the link on the side remote of the valve plate 5 is a part of the link 25 which extends at an inclination relative to the axis 10 of the valve rod and extends over the axial portion c. In the embodiment example shown in the drawing, the course of this part of the link curves in a slightly arc-shaped manner. However, a straight course would also be usable. The course of these parts of the link corresponds in principle to that of the link of a conventional butterfly valve such as is known, for example, from U.S. Pat. No. 4,634,094.

Figure 7:
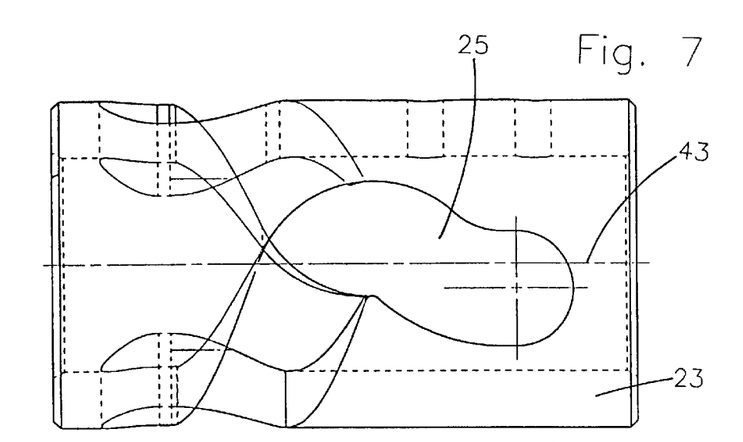
FIG. 7 shows a side view of the sleeve having the link.
Figure 8:
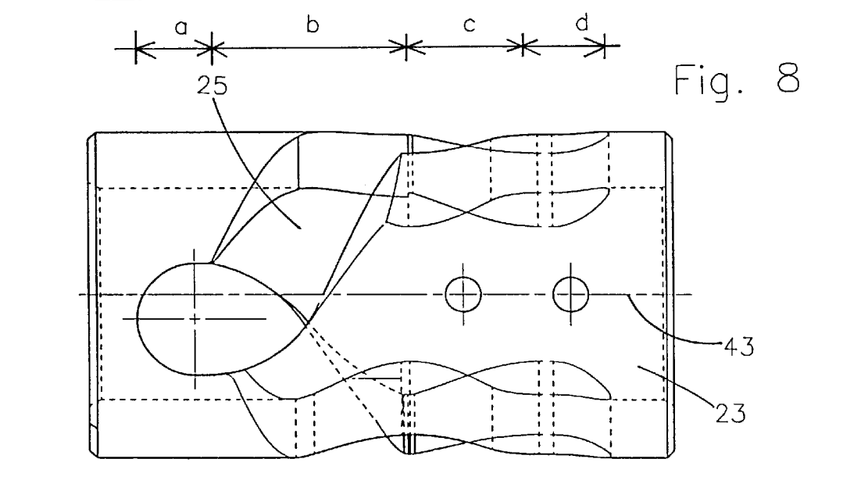
FIG. 8 shows a side view of the sleeve which is rotated by 90° about its longitudinal axis relative to FIG. 7.

Further, parts of the link which extend along the axial portions a and d and which are approximately parallel (in the range of ±10°) to the longitudinal axis 10 of the valve rod 7 in the closed state are located at both ends of the link. An automatic locking of the valve against a displacement of the valve in the completely open and completely closed state is achieved by these end parts of the link.

A journal 26 penetrating the valve rod 7 is guided in the link 25, namely, by means of needle-mounted rollers 27 which are arranged on this journal 26 at both sides and project into the link 25.

Figure 1:
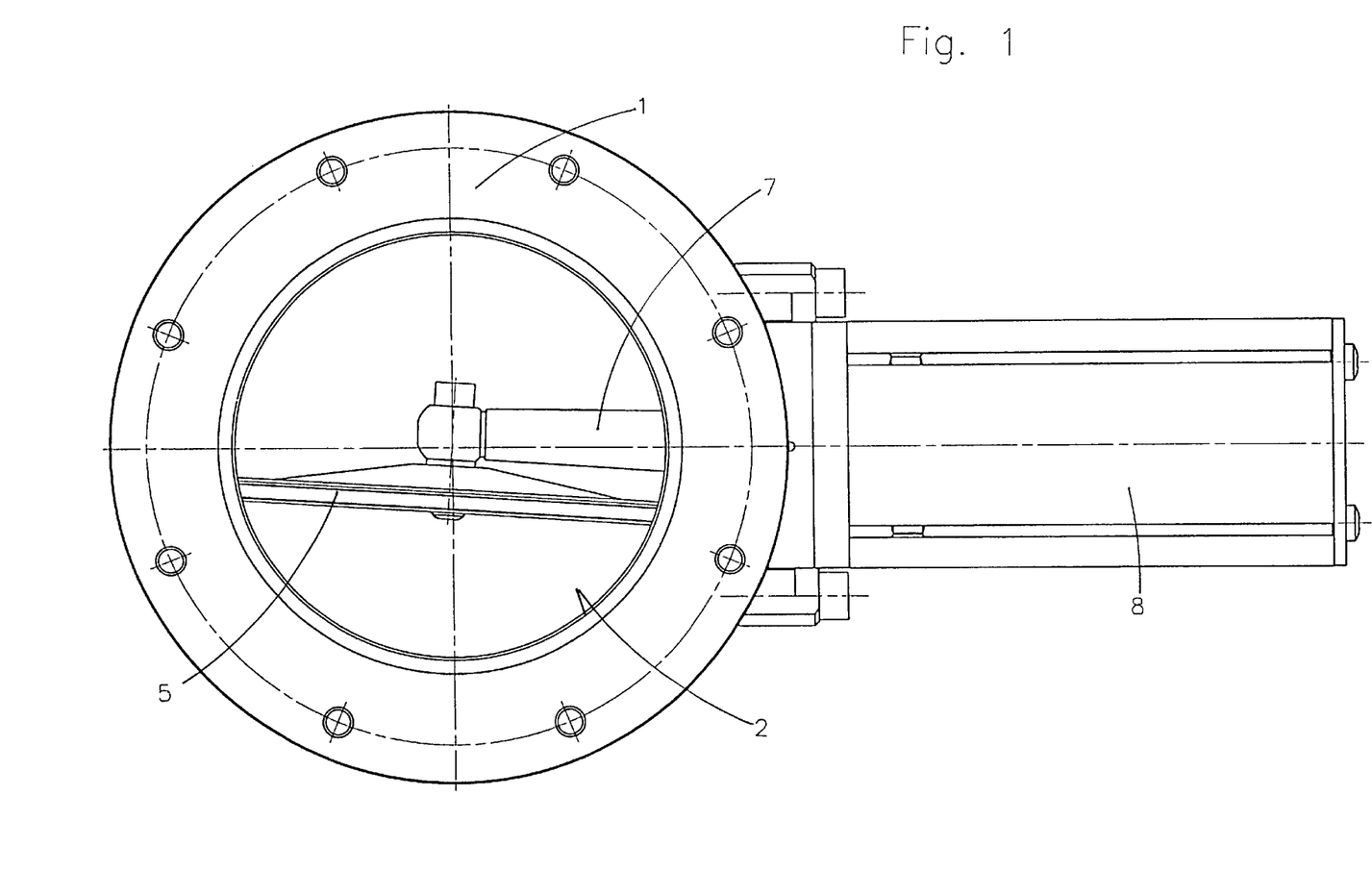
FIG. 1 shows a view of a butterfly valve according to the invention in the open state.
Figure 2:
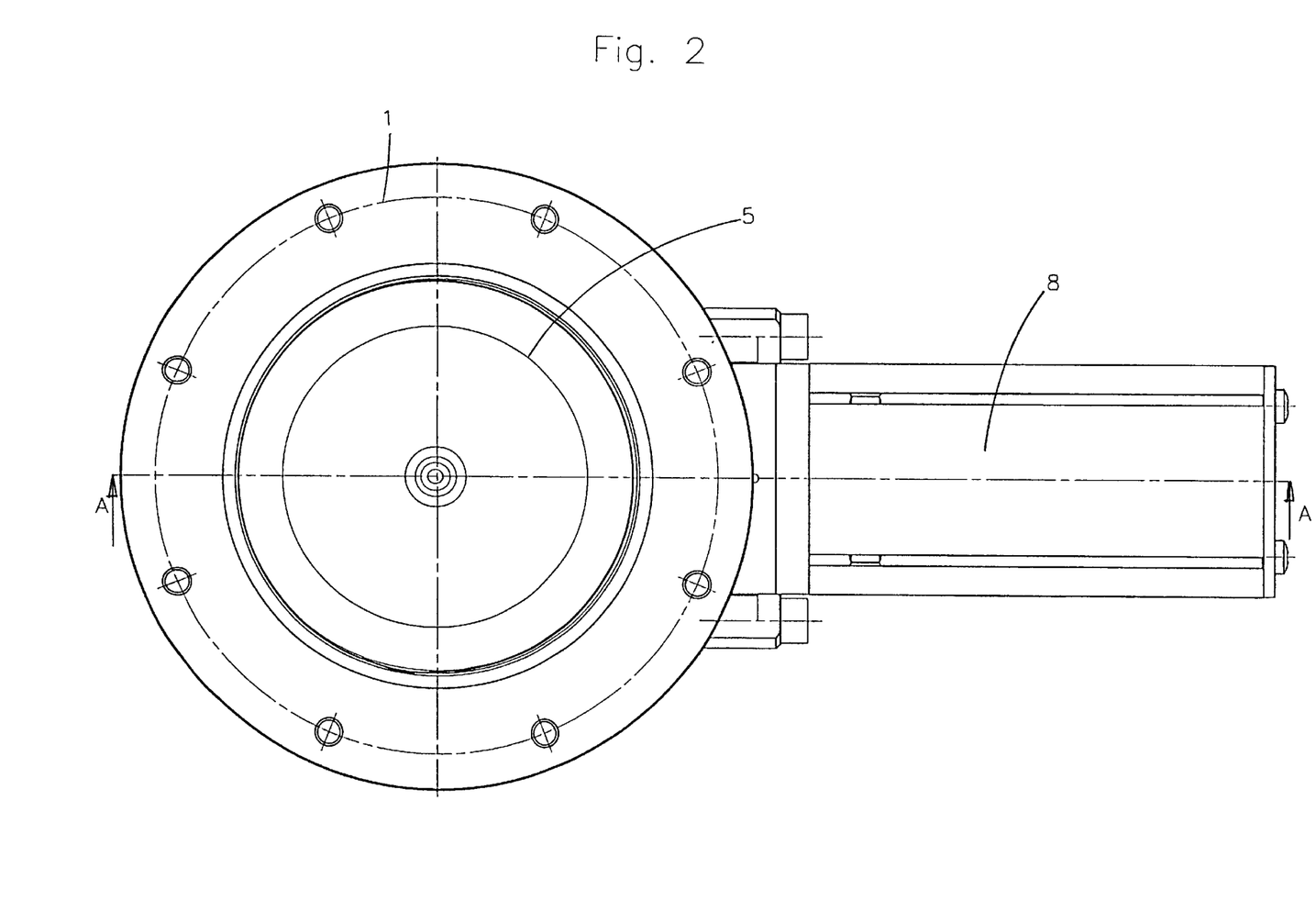
FIG. 2 shows the valve in the partially closed state (valve plate tilted but not rotated)
Figure 3:
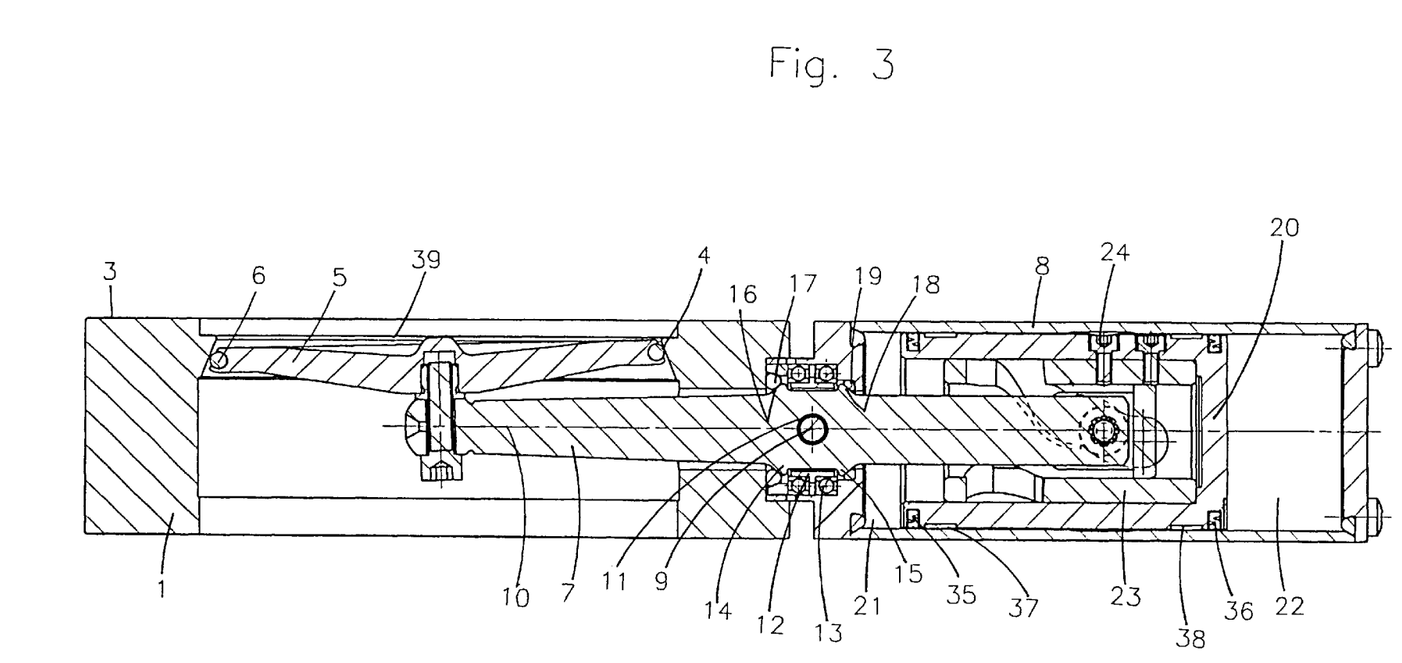
FIG. 3 shows a longitudinal middle section along line AA of FIG. 2.
Figure 4:
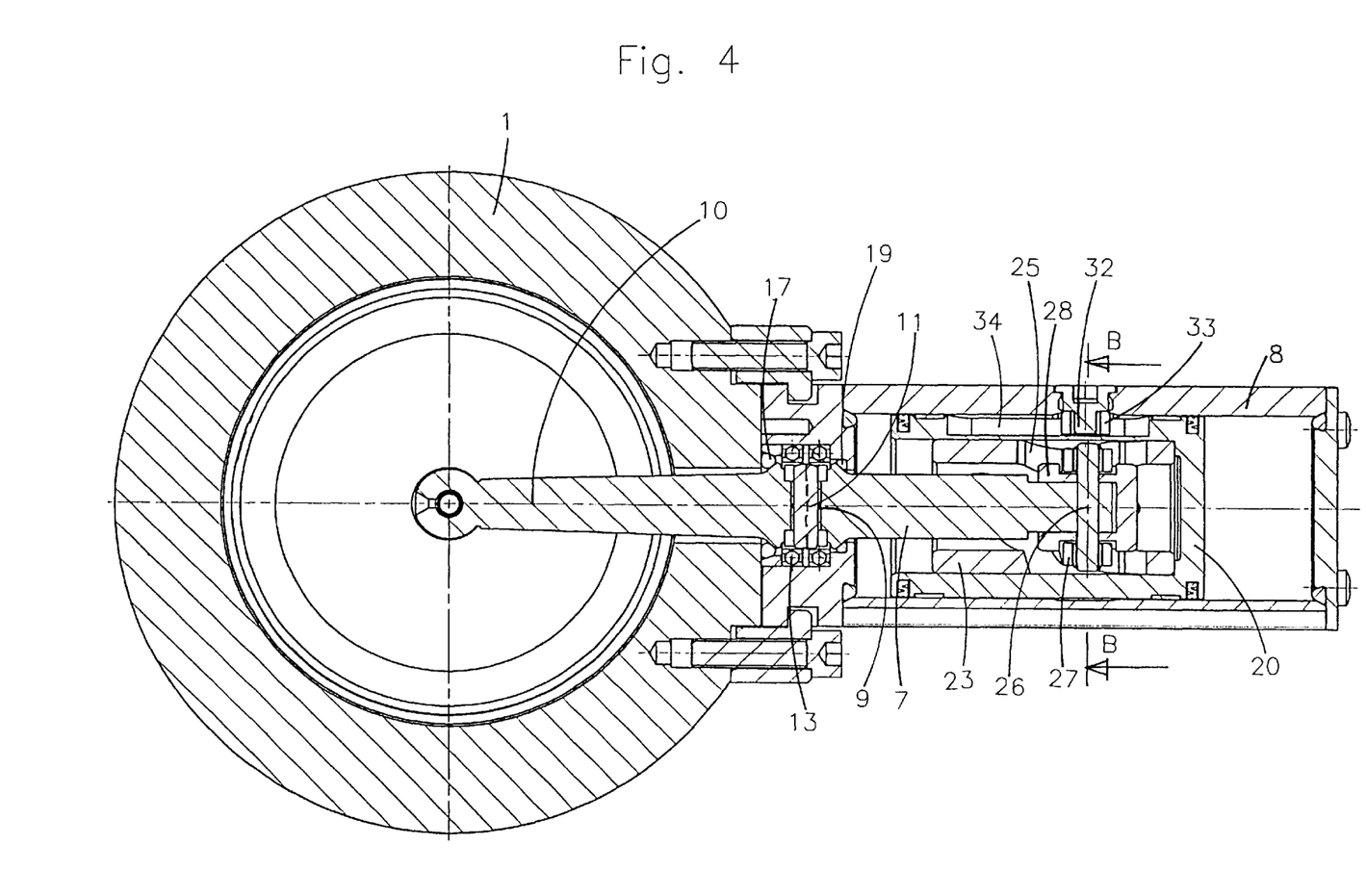
FIG. 4 shows a longitudinal middle section in a plane vertical to the section plane of FIG. 3.
Figure 5:
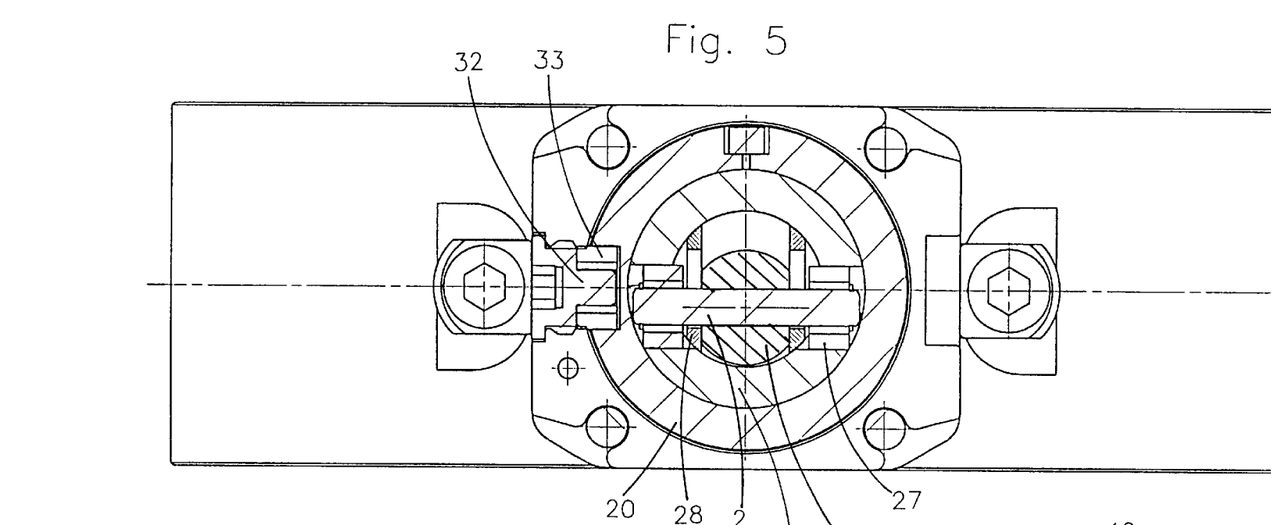
FIG. 5 shows a cross section along line BB of FIG. 4.
Figure 6:
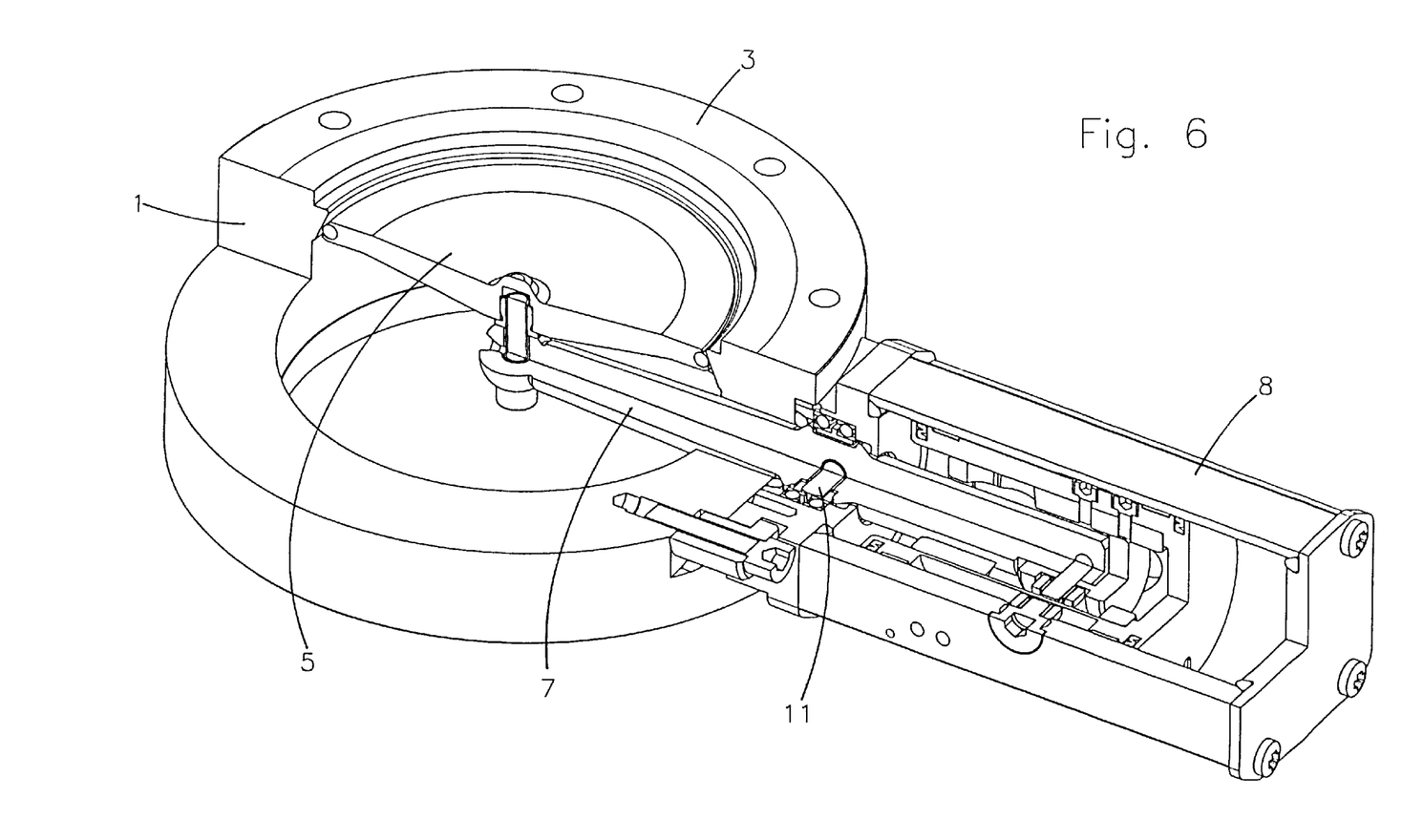
FIG. 6 shows a perspective view of the valve, partially in section.

In the completely open state of the valve (FIG. 1), the journal 26 or the rollers 27 lies or lie in the part of the link extending along the axial portion a. When the piston 20 is displaced toward the left in that the cylinder space 22 is acted upon by compressed air, the journal 26 is initially displaced in the part of the link extending along the axial portion b and within this part, wherein the valve rod 7, and, along with it, the valve plate 5, compulsorily rotates by 90° about its longitudinal axis 10. After this rotation by 90°, the valve occupies the position shown in FIGS. 2 to 4. When the piston 20 is further displaced in the same movement direction subsequently, the journal 26 now moves in part c of the link, wherein the valve rod 7 is accordingly tilted together with the valve plate 5 and the valve plate 5 is pressed into the sealing closed position in which the sealing ring 6 is pressed against the valve seat. In the end position, the journal 26 or the rollers 27 is/are now located in part d of the link. In the side view and section corresponding to FIG. 3, the center of the journal 26 is offset downward relative to the longitudinal axis 39 of the sleeve 23. The cross section corresponding to FIG. 5 shows this end position of the journal 26 in the completely closed state of the valve. When the valve is open, the described movements proceed in the opposite order, that is, the valve plate 5 is first tilted and subsequently rotated (about the longitudinal axis 10 lying outside of the valve plate). The angular range of the tilting of the longitudinal axis 10 of the valve rod 7 is relatively small and is located, for example, in the range of ±2.5° relative to the plane 39 of the valve seat. This tilting is at most in the range of ±5°.

Figure 9:
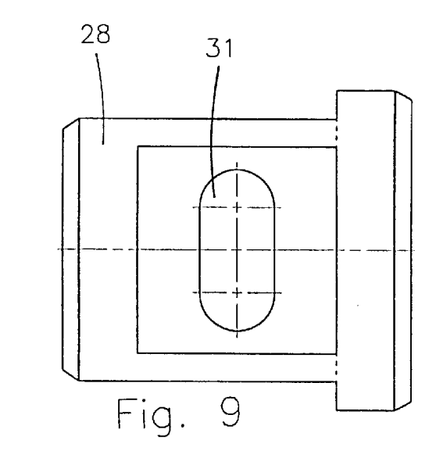
FIG. 9 shows a side view of the sliding piece located between the valve rod and the sleeve having the link.
Figure 10:
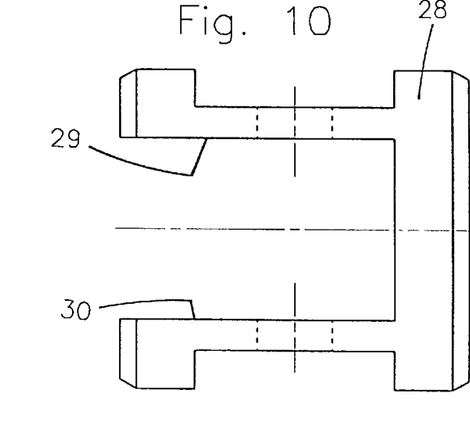
FIG. 10 shows a side view of the sliding piece which is rotated by 90°.

In order to enable tilting of the valve rod 7, its diameter is smaller than the inner diameter of the sleeve 23. However, the sleeve-shaped sliding piece 28 which is located between the valve rod 7 and the sleeve 23 and shown in an enlarged view in FIGS. 9 and 10 is provided to achieve a lateral guiding of the valve rod (in axial direction of the journal 26). The inner surfaces 29, 30 contact corresponding flattened portions of the valve rod 7 and the journal 26 projects through the elongated hole 31 and when the valve rod 7 is tilted is displaced relative to the latter. When the valve rod 7 rotates about its longitudinal axis, the sliding piece 28 rotates together with it inside the sleeve 23.

Means are provided for preventing rotation of the piston 20 relative to the cylinder 8. These means are formed by a roller 33 which is mounted so as to be rotatable on a bearing journal 32 projecting over the inner wall of the cylinder 8 and which projects in turn into an elongated recess 34 in a wall in the cylindrical jacket surface of the piston 20.

The piston 20 is sealed relative to the inner wall of the cylinder 8 via seals 35, 36. In order to receive radial reaction forces occurring when the valve rod is actuated, sliding rings 37, 38 are provided at the piston. Instead, a sliding bushing could also be provided at the inner wall of the cylinder 8.

Figure 11:
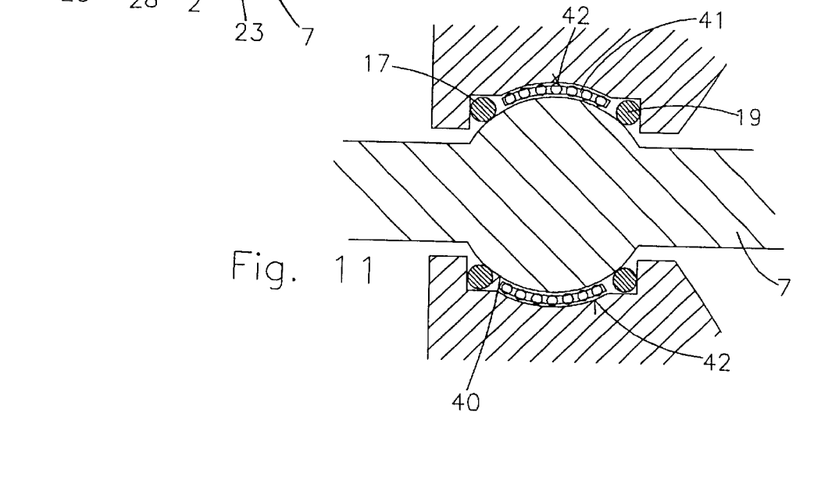
FIG. 11 shows a schematic view of a modified embodiment form of the rotating/tilting joint which is sealed on both sides.

Instead of the rotating/tilting through-guide shown herein, this could also be constructed, for example, corresponding to the schematic FIG. 11. In this case, a ball joint surface 40 is formed at the valve rod 7 and projects over the valve rod and is supported via ball bearings 41 in hollow-ball-shaped joint surfaces 42 which are arranged at the valve housing 1 or at the cylinder 8. The ball joint surfaces 40 also form sealing surfaces, and sealing rings 17, 19 for sealing the valve rod 7 relative to the valve housing and relative to the cylinder 8 are pressed against these sealing surfaces.

Because of the construction according to the invention, a butterfly valve such as has been available until now only for relatively large nominal widths can also be produced for any small nominal widths of the valve opening.

Instead of an actuating part in the form of a piston 20 which is fitted in a cylinder 8, another actuating part could also be provided. For example, the sleeve 23 could be displaced axially by a spindle drive, wherein the sleeve 23 is guided axially in a corresponding manner and a drive motor is provided for adjusting the spindle. The sleeve 23 could be prevented from rotating relative to its linear guide or these means for preventing rotation could be provided already for the spindle of the spindle drive as is conventional in commercially available spindle drives. in principle, a manual displacement of the sleeve 23 is also conceivable and possible.

Instead of securing the link 25 to the actuating member (to the piston 20 in the shown embodiment example), this link could also be provided at the valve rod or at a part connected with the latter and the journal, which together with the link forms the link guide, could be secured to the actuating member or to a part connected with the latter.

As will follow from the preceding description, the field of the invention is not limited to the embodiment examples shown herein, but should be defined with reference to the appended claims together with their full range of possible equivalents. While the invention is depicted in the preceding description and the drawings, it will be appreciated by the person skilled in the art that different changes can be carried out, for example, in the means for preventing rotation for the piston 20 or in the lateral guide of the valve rod 7 (which is caused by the sliding piece 28 in the embodiment example shown herein) without departing from the true spirit and field of the invention.

What is claimed is:

1. A butterfly valve comprising:
   a valve housing with a valve opening and a valve seat, said valve housing enclosing a vacuum area of the valve;
   a valve plate which is mounted at a valve rod guided through the valve housing and which is pressed against the valve seat in!a closed position of the valve, tilted relative to the valve seat in a partially open position of the valve through tilting of the valve rod about a tilting axis, and tilted and rotated relative to the valve seat in a completely open position of the valve by subsequent rotation of the valve rod about its longitudinal axis;
   said valve rod having portions extending on both sides of the tilting axis, the portion located on one side of the tilting axis acting centrally at the valve plate and the portion located on the other side of the tilting axis being connected to an actuating member;
   said connection to said actuating member being made by a link guide which is located outside the vacuum area and which has a link with a part extending at an inclination to the longitudinal axis of the valve rod and with a helical surface-shaped part and a journal which is guided in the link;
   said actuating member being mounted so as to be displaceable in the axial direction of the valve rod.

2. The butterfly valve according to claim 1, wherein the actuating member is a piston which is mounted so as to be displaceable in a piston.

3. The butterfly valve according to claim 1, wherein the tilting axis of the valve rod is formed by a pin penetrating the valve rod, and this pin is mounted by its two lateral ends at a ring which surrounds the valve rod and which has a central longitudinal axis around which it is mounted so as to be rotatable.

4. The butterfly valve according to claim 3, wherein the ring is mounted via a ball bearing so as to be rotatable about its longitudinal axis.

5. The butterfly valve according to claim 3, wherein an annular projection is provided at the valve rod at a location which is offset from the tilting axis in direction of the valve plate and which has, on its side facing the valve plate, an ascending face which forms a sealing surface and against which a sealing ring is pressed.

6. The butterfly valve according to claim 5, wherein the surface is a part of a spherical surface whose center is formed by the intersection between the tilting axis and the central longitudinal axis of the valve rod.

7. The butterfly valve according to claim 3, wherein an annular projection is provided at the valve rod at a location which is offset from the tilting axis in direction of the cylinder and which has, on its side facing the cylinder, an ascending face which forms a sealing surface and against which a sealing ring is pressed.

8. The butterfly valve according to claim 7, wherein the ascending face is a part of a spherical surface whose center is formed by the intersection between the tilting axis and the longitudinal axis of the valve rod.

9. The butterfly valve according to claim 1, wherein a ball joint surface protrudes at the valve rod and is mounted via ball bearings in a ball socket-shaped joint surface at the housing or at the cylinder and against which sealing rings are pressed for sealing the valve rod relative to the housing and relative to the cylinder.

10. The butterfly valve according to claim 1, wherein the link has a part at the edge side which faces away from the valve plate and which is approximately parallel to the longitudinal axis of the valve rod in the closed state of the valve.

11. The butterfly valve according to claim 10, wherein the link has a part at the edge side which faces the valve plate and which is approximately parallel to the longitudinal axis of the valve rod in the closed state of the valve.

12. The butterfly valve according to claim 1, wherein the tilting axis lies outside the vacuum area of the valve.

13. The butterfly valve according to claim 2, wherein the piston is prevented from rotating relative to the cylinder.

14. The butterfly valve according to claim 1, wherein the portion of the valve rod which is connected, via the link guide, to the actuating member lies outside of the vacuum area of the valve.

15. The butterfly valve according to claim 1, wherein the link is formed in a sleeve which is connected with the actuating member.

* * * * *